(12) United States Patent
Fan

(10) Patent No.: US 11,972,292 B1
(45) Date of Patent: Apr. 30, 2024

(54) INTERCONNECT SWITCH USING MULTI-BANK SCHEDULING

(71) Applicant: XConn Technologies Holdings, Inc., San Jose, CA (US)

(72) Inventor: Yan Fan, Los Altos Hills, CA (US)

(73) Assignee: XConn Technologies Holdings, Inc., San Jose, CA (US)

( * ) Notice: Subject to any disclaimer, the term of this patent is extended or adjusted under 35 U.S.C. 154(b) by 445 days.

(21) Appl. No.: 17/216,107

(22) Filed: Mar. 29, 2021

Related U.S. Application Data

(60) Provisional application No. 63/001,992, filed on Mar. 30, 2020.

(51) Int. Cl.
G06F 9/50 (2006.01)
G06F 9/48 (2006.01)
G06F 13/16 (2006.01)

(52) U.S. Cl.
CPC .......... *G06F 9/5016* (2013.01); *G06F 9/4881* (2013.01); *G06F 9/5038* (2013.01); *G06F 13/1668* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 6,711,170 B1 * | 3/2004 | Brown | H04L 49/103 711/E12.079 |
| 7,779,286 B1 | 8/2010 | Pritchard | |
| 9,672,151 B1 | 6/2017 | Ma | |
| 10,915,486 B1 | 2/2021 | Khan | |
| 2001/0032282 A1 | 10/2001 | Marietta | |
| 2004/0105384 A1 * | 6/2004 | Gallezot | H04L 47/10 370/229 |
| 2014/0052938 A1 | 2/2014 | Kim | |
| 2014/0064271 A1 * | 3/2014 | Boden | H04L 49/00 370/389 |
| 2015/0026384 A1 | 1/2015 | Maitra | |
| 2015/0109024 A1 | 4/2015 | Abdelfattah | |
| 2015/0373115 A1 | 12/2015 | Breakstone | |
| 2018/0026638 A1 | 1/2018 | Atsatt | |
| 2019/0065427 A1 | 2/2019 | Wortman | |
| 2019/0197006 A1 | 6/2019 | Teh | |
| 2019/0354481 A1 | 11/2019 | Ono | |
| 2021/0240655 A1 | 8/2021 | Das Sharma | |
| 2022/0188178 A1 | 6/2022 | Bert | |
| 2022/0318181 A1 | 10/2022 | Cannata | |
| 2023/0027178 A1 | 1/2023 | Shah | |
| 2023/0114164 A1 | 4/2023 | Pal | |

* cited by examiner

*Primary Examiner* — Eric C Wai
(74) *Attorney, Agent, or Firm* — Van Pelt, Yi & James LLP

(57) ABSTRACT

Switches and methods for utilizing the switches are described. The switch has ports, a memory and a scheduler. Packets ingress and egress the switch through the ports. Each packet is divisible into packet segments. The memory includes banks. The scheduler is coupled with the ports and the memory. The scheduler is configured to allocate memory to store the packet segments in the banks such that a beginning packet segment of a packet is stored in a selected bank and each subsequent packet segment in the packet is stored in order in a next adjacent bank.

20 Claims, 6 Drawing Sheets

INTERCONNECT SWITCH USING MULTI-BANK SCHEDULING

CROSS REFERENCE TO OTHER APPLICATIONS

This application claims priority to U.S. Provisional Patent Application No. 63/001,992 entitled SHARED MULTI-BANK BUFFER SCHEDULING ALGORITHM TO AVOID HEAD-OF-LINE BLOCKING IN AI/HPC INTERCONNECT FABRIC filed Mar. 30, 2020 which is incorporated herein by reference for all purposes.

BACKGROUND OF THE INVENTION

In order to accommodate the volume and speed at which data are produced by and desired to be exchanged between processors in a system, such as the central processing unit (CPU), graphics processing unit (GPU), tensor processing unit (TPU), and other artificial intelligence (AI) processors, interconnects (e.g. switches) are desired to have a high data exchange rate. Further, the latency and power dissipation for switches are desired to be reduced. Failure to achieve the desired data exchange rates, latencies and low power dissipation can not only result in critical bottlenecks to system performance, but also increase power consumption. Moreover, system cost may increase if multiple switches are required to provide sufficient communication capacity. Consequently, improved mechanisms for transferring data between components are desired.

BRIEF DESCRIPTION OF THE DRAWINGS

Various embodiments of the invention are disclosed in the following detailed description and the accompanying drawings.

DETAILED DESCRIPTION

Figure 1:
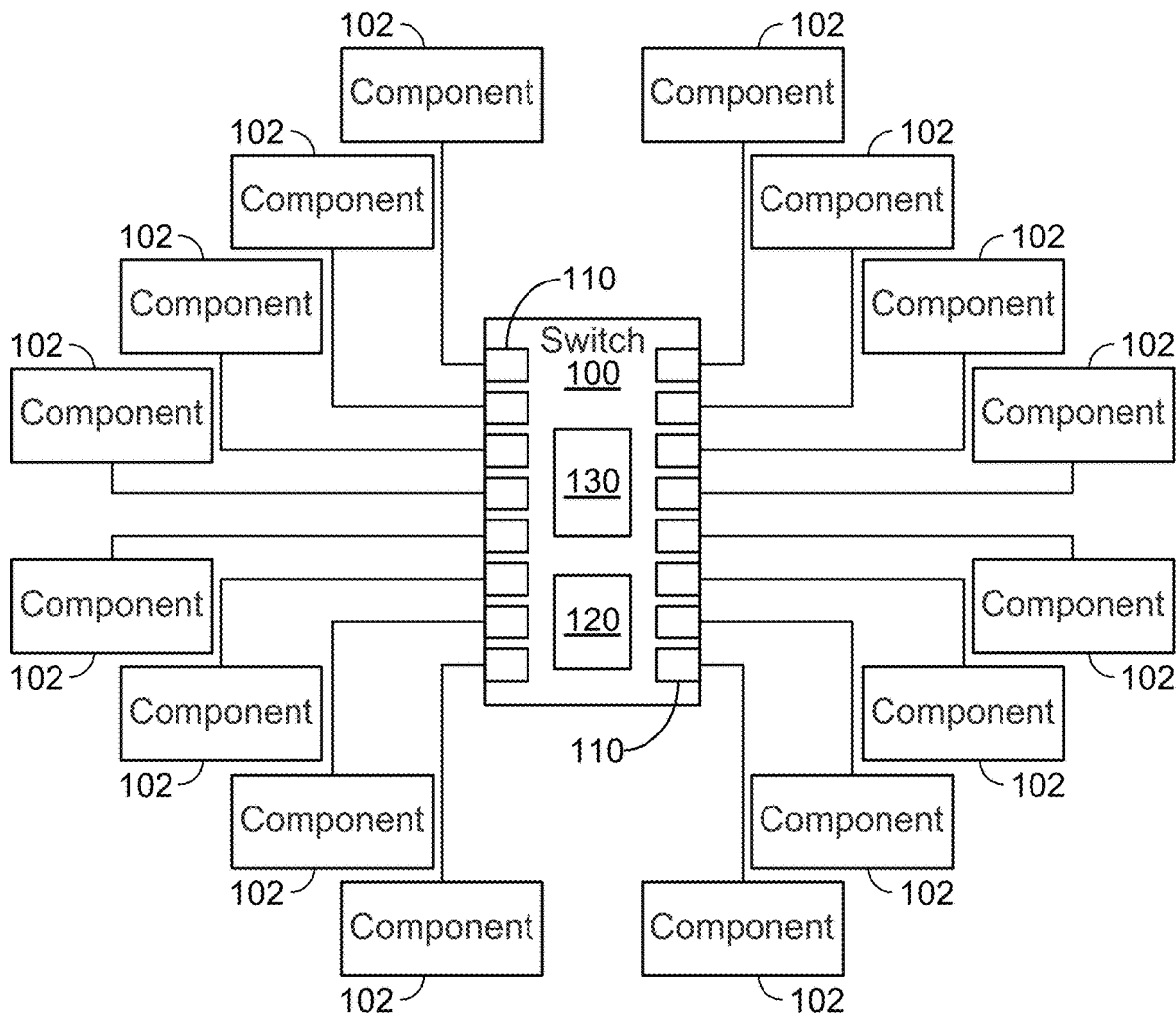
FIG. 1 depicts an embodiment of a switch including a multibank memory.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

For computationally intensive applications, such as data mining, visual processing, speech processing, high performance computing (HPC), and other machine learning (ML) applications, processors (e.g. the CPU, GPU, and/or TPU) produce and use large amounts of data. This and other data should be seamlessly exchanged between the processors to allow the processors to perform their tasks at a sufficiently high rate. However, interconnects (e.g. switches) used in exchanging data among such processors may lack the capacity for transmitting traffic at such rates. Thus, switches may form bottlenecks that reduce system performance.

Latency and power consumption may also limit the overall performance in ML systems, HPC systems, and similar systems. Latency is a measure of the delay in the traffic and directly relates to the system computing performance metrics (e.g. MLPerf). In general, lower latency allows better the system performance to be achieved. However, current switches may result in higher latencies. Current switches are also generally configured for SSD storage PCIe switch connections. Consequently, silicon resources are dedicated to other storage features that may be unnecessary for ML and HPC systems. Such resources also consume additional power without providing a performance benefit. In addition to this deficiency, the current solutions may not provide sufficient data communication capacity. ML and HPC systems thus may require more interconnects to connect processors. This also contributes to the higher power dissipation in ML systems. Thus, various factors relating to communication between components adversely impacts system performance. Consequently, a mechanism for improving communication, particularly at lower cost, is desired.

Switches and methods for utilizing the switches are described. The switch has ports, a memory and a scheduler. In some embodiments, the switch is a Peripheral Component Interconnect Express (PCIe) switch. Packets ingress and egress the switch through the ports. Each packet is divisible into packet segments. The memory includes banks. The scheduler is coupled with the ports and the memory. The scheduler is configured to allocate memory to store the packet segments in the banks such that a beginning packet segment of a packet is stored in a selected bank and each subsequent packet segment in the packet is stored in order in a next adjacent bank. In some embodiments, each of the banks has a numerical designation. In some such embodiments, the scheduler is configured to allocate the memory such that the order is an ascending numerical order. In some embodiments, the assignment of packet segments wraps around to the lowest numerical designation bank. Thus, the next adjacent bank for the highest numerical designation bank is the lowest numerical designation bank.

The scheduler is configured to allocate memory segments within each bank such that packet segments are stored in a next available memory segment of the bank. Thus, one packet segment of a packet is stored in a first memory segment. Another packet segment of the same packet is stored in a next available memory segment of the bank. In some embodiments, multiple packets segments from the same packet are stored such that they need not be contiguous. In some embodiments, the scheduler is configured to provide a linked list for each packet. The linked list identifies the selected bank for the beginning packet segment and a memory segment within the next adjacent bank for each subsequent packet segment.

In some embodiments, each port includes a virtual output queue (VOQ) for each remaining port. The VOQs store packet information for the packet ingressing through the port and egressing through each remaining port. In some embodiments, the packet information includes the linked list for the packet. The linked list identifies the selected bank for the beginning packet segment of the packet, a beginning memory segment within the selected bank for the beginning packet segment, and a memory segment within the next adjacent bank for each subsequent packet segment.

In some embodiments, a PCIe switch is described. The PCIe switch includes ports through which packets ingress and egress the PCIe switch. Each packet is divisible into packet segments. Each bank has a numerical designation. The PCIe switch also includes a memory having a plurality of banks. The PCIe switch also includes a scheduler coupled with the ports and the memory. The scheduler is configured to allocate memory to store the packet segments in banks such that a beginning packet segment of a packet is stored in a selected bank and each subsequent packet segment in the packet is stored in ascending order of the numerical designation in a next adjacent bank. The next adjacent bank for a bank having a highest numerical designation bank is the lowest numerical designation bank. The scheduler is also configured to allocate memory segments within each bank such that one packet segment of the plurality of packet segments is stored in a first memory segment in a bank and a subsequent packet segment of the packet segments is stored in a second memory segment of the bank. The second memory segment can be noncontiguous to the first memory segment.

A method is also described. A packet is received in a port of a switch that includes multiple ports. The packet is divisible into a multiple packet segments. The method also allocates memory segments in a memory. The memory includes multiple banks. The memory segments are allocated such that a beginning packet segment of the packet is stored in a selected bank and each subsequent packet segment is stored in order in a next adjacent bank. In some embodiments, allocating the memory segments includes identifying the selected bank for the beginning packet segment and storing the beginning packet segment to the selected bank. The next adjacent bank is locked for the next packet segment. The next packet segment is stored in the next adjacent bank. The steps of locking and storing the next packet segment are repeated for remaining packet segments. The method may also include identifying a first memory segment in the selected bank for the beginning packet segment. The beginning packet segment is stored in the first memory segment. The next memory segment in the next adjacent bank is identified and the next packet segment stored in the next memory segment. The identifying the next memory segment and storing the next memory segment processes are repeated for remaining packet segments.

In some embodiments, each bank has a numerical designation. In some such embodiments, the method allocates the memory such that each subsequent packet segment in the packet is stored in the next adjacent bank in ascending numerical order. The next adjacent bank for the highest numerical designation bank is the lowest numerical designation bank. In some embodiments, the method allocates the memory such that each subsequent packet segment in the packet is stored in the next adjacent bank in descending numerical order. The next adjacent bank for the lowest numerical designation bank is the highest numerical designation bank.

In some embodiments, the process of allocating the memory further includes identifying memory segments within the banks such that multiple packet segments of the packet are stored in noncontiguous memory segments. In some embodiments, the method includes providing a linked list for the packet. The linked list identifies the selected bank for the beginning packet segment, a beginning memory segment within the selected bank for the beginning packet segment, and a memory segment within the next adjacent bank for each subsequent packet segment.

In some embodiments, the packet is configured to egress at a remaining port. In such embodiments, the method also includes storing packet information for the packet in a VOQ of the port. The VOQ corresponds to the remaining port.

In some embodiments, the method includes storing a linked list for the packet. The linked list identifies the selected bank for the beginning packet segment of the packet, a beginning memory segment within the selected bank for the beginning packet segment, and a memory segment within the next adjacent bank for each subsequent packet segment of the packet. The linked list may include addresses for the beginning packet segment and each subsequent packet segment.

FIG. 1 is a block diagram depicting an embodiment of switch 100 including multibank memory 130. For clarity, only some portions of switch 100 are shown. Also shown are components 102 coupled via switch 100. Components 102 may include processors such as CPUs, GPUs, and/or TPUs. In some environments, multiple switches 100 and more components 102 may be coupled together.

Switch 100 includes ports 110 (of which only two are labeled), scheduler 120 and memory 130. In some embodiments, switch 100 is a PCIe switch. Although a component 102 is coupled to each port 110 in the embodiment shown, switch 100 may have some port(s) that are not coupled with any component. Although sixteen ports 110 are shown, in some embodiments, switch 100 may have another number of ports. Ports 110 receive data, for example in transaction layer packets (TLPs). Each packet may include a header having control information and a payload including data desired to be transmitted. In some embodiments, each port 110 has sixteen lanes for PCIe communication. Ports 110 may also perform some logical functions. For example, packet headers may be decoded to determine length of the payload (and thus the number of packet segments) within a packet and the destination port 110 or destination component 102. Serialization and/or deserialization may also be performed in each port 110, for example in a serializer/deserializer (SerDes) (not explicitly shown in FIG. 1). Ports 110 may also perform other functions.

A fabric (not explicitly shown) couples memory 130 with ports 110. For example, in some embodiments, a crossbar fabric couples memory 130 with ports 110. Memory 130 may, therefore, store data that ingresses from and/or egresses to any of ports 110. Scheduler 120 is coupled with ports 10 and memory 130. Scheduler 120 allocates portions of memory 130 to store data received at ports 110. In addition, scheduler 120 controls accessing of data from memory 130 to send on to components 102 via ports 110. Thus, traffic from a component 102 ingressing from one port 110 may egress switch 100 at other port 110 and be transferred to another component 102.

Memory 130 includes multiple memory banks (not explicitly shown in FIG. 1) in which packets are stored for transiting between ports 110 through switch 100. In some embodiments, memory 130 includes sixteen banks. Each memory bank may be accessed via a data bus (not explicitly shown) that has a 512-bit width in some embodiments. In some embodiments, each bank includes multiple memory segments. Each memory segment is capable of storing a packet segment. For example, a memory segment may have a length of 64 bytes and each bank may include two hundred and fifty six memory segments. Thus, a packet segment is such an embodiment has a length of 64 bytes (e.g. the maximum length of a packet segment is 64 bytes).

In operation, packets ingress switch 100 through ports 110. Each packet includes one or more packet segments. Scheduler 120 allocates memory 130 such that packet segments are stored in multiple banks of memory 130. More specifically, scheduler 120 determines a selected bank in which the beginning packet segment of a packet is stored. This beginning packet segment is stored in the selected bank. Scheduler 120 stores subsequent packet segments in order in the next adjacent bank. Thus, the second segment is stored in the bank next to the selected bank. The third packet segment is stored in the bank two banks away from the selected bank. This process continues until all packet segments have been stored. In some embodiments, scheduler 120 allocates memory in such a manner that memory allocation wraps around to the selected bank if there are more packet segments than memory banks. If there are sixteen memory banks and seventeen packet segments, the selected memory bank stores the first and last packet segments. For example, supposed there are sixteen banks and each bank has a numerical designation starting at 0 and ending with 15. Scheduler 120 may choose bank 3 as the selected bank to store the beginning packet segment. In addition, suppose the packet has seventeen packet segments. For scheduler 120 storing packet segments in ascending order of the banks, the second packet segment is stored in bank 4, the third packet segment is stored in bank 5, and so on. The thirteenth packet segment is stored in bank 15 and the fourteenth segment is stored in bank 0. This continues until the seventeenth segment is stored in bank 3. Alternatively, for scheduler 120 storing packet segments in descending order, the second packet segment is stored in bank 2, the third packet segment is stored in bank 1, the fourth packet segment is stored in bank 0, the fifth packet segment is stored in bank 15, and so on. Thus, each packet is spread across multiple banks.

Thus, switch 100 stores an individual packet in multiple banks of memory 130. Ports 110 thus share memory 130 instead of one bank of memory 130 being dedicated to a particular port. As a result, memory utilization may be increased. Further, switch 100 may be less likely to have ports 110 that are choked. For example, if a particular port 110 is busy, but remaining ports are not, switch 100 may prevent the busy port from being choked by a full memory bank. Further, scheduler 120 may be more efficient. Packet segments are stored deterministically. Stated differently, once the selected bank is identified for the beginning packet segment, the banks for the remaining packet segments are known (e.g. are the next bank in ascending or descending order of banks). Consequently, allocation of memory by scheduler may be more efficient. As a result, the flow of data through switch may be facilitated. Consequently, switch 100 may be better able to serve systems requiring high data exchange rates, such as for ML and HPC applications.

Figure 2:
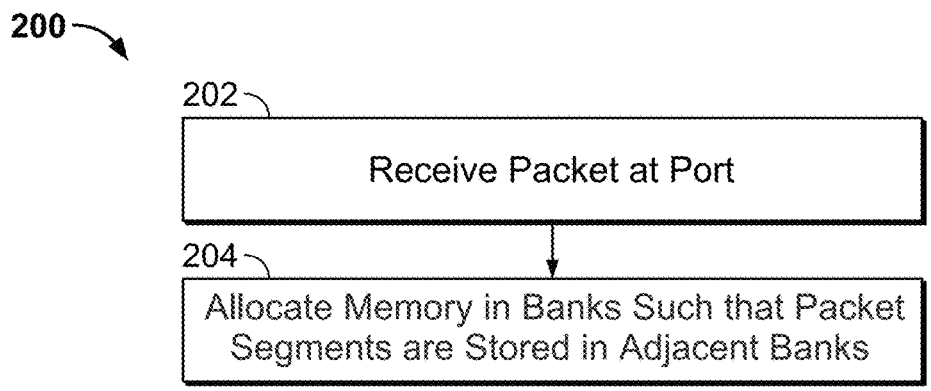
FIG. 2 is a flow-chart depicting an embodiment of a method for allocating memory in a switch including a multi-bank memory.

FIG. 2 is a flow-chart depicting an embodiment of method 200 for allocating memory in a switch including a multi-bank memory. Method 200 is described in the context of a single packet. However, portions method 200 may be performed in parallel for multiple packets entering the switch at multiple ports.

A packet is received in a port, at 202. In some embodiments, the packet may be a TLP. The packet may include a header describing aspects of the packet (e.g. the packet format and length of the data in the payload). The packet is divisible into packet segments. Each packet segment is not longer than a memory segment. Because the length of the payload is included in the header, the number of packet segments in the packet (e.g. in the payload) may be determined.

Memory segments are allocated to the packet in a memory including multiple banks, at 204. More specifically memory segments in the banks are allocated such that a beginning packet segment of the packet is stored in a selected bank and each subsequent packet segment in the packet is stored in order in a next adjacent bank. As a result, the packet is stored across multiple banks. Portions of method 200 may be performed substantially in parallel for multiple packets. Thus, packet segments for different packets may be stored substantially simultaneously in different banks of the memory.

For example, a packet may be received at labeled port 110, at 202. The packet may include 6 packet segments of payload. Thus, at 204, a beginning bank of memory 130 is selected for the packet and the beginning (i.e. first) packet segment stored in the beginning bank. The beginning bank selected is a bank that is available for storage. For example, if memory 130 has banks 0, 1, 2, 3, 4, 5 and 6 and bank 2 is open, then the selected bank may be bank 2. The remaining segments may be stored in order in banks 3, 4, 5, 6, and 0, respectively. While the beginning packet segment for the packet is stored in bank 2 using method 200, packet segments for other packets may be stored in banks 0, 1, 3, 4 and 5. Because packet segments for all packets are stored deterministically in the same order (e.g. all in ascending order), once the beginning bank is selected, there are no collisions. In the example above, while the beginning packet segment for the packet is stored in bank 2 using method 200, a packet segment for a second packet may be stored in bank 3. When the next packet segment of the packet is stored in bank 3, the next packet segment for the second packet is automatically stored in bank 4. Thus, method 200 stores packet segments across multiple banks of memory in a deterministic manner.

Using method 200, memory utilization may be increased. Further, method 200 is less likely result in ports that are choked because a dedicated memory bank is full. Method 200 may also more efficiently schedule and perform storage of packets. As a result, the flow of data through a switch may be facilitated. Consequently, method 200 and the switch using method 200 may be better able to serve systems requiring high data exchange rates, such as for ML and HPC applications.

Figure 3:
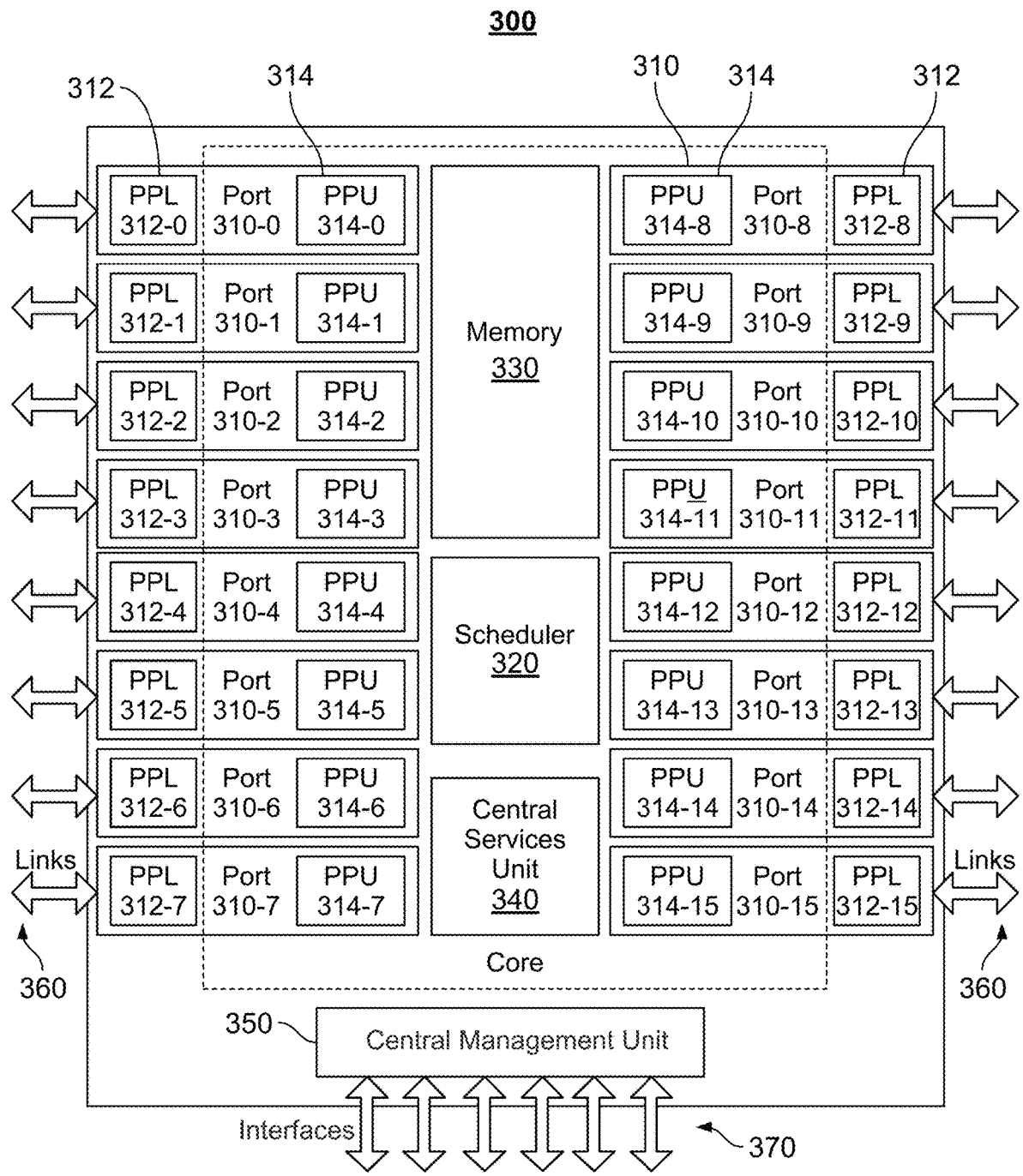
FIG. 3 depicts an embodiment of a switch including a multibank memory.

FIG. 3 is a block diagram depicting an embodiment of switch 300 including multibank memory 330. For clarity, only some portions of switch 300 are shown. Switch 300 may be a PCIe switch and is described in the context of PCIe. However, in some embodiments, switch 300 may be another type of switch.

Switch 300 is analogous to switch 100. Consequently, similar components have analogous labels. Thus, switch 300 includes sixteen ports 310-0, 310-1, 310-2, 310-3, 310-4, 310-5, 310-6, 310-7, 310-8, 310-9, 310-10, 310-11, 310-12, 310-13, 310-14, and 310-15 (collectively or generically ports 310). Ports 310, scheduler 320 and memory 330 are analogous to ports 110, scheduler 120 and memory 130, respectively. Also shown are central services unit 340, central management unit 350, PCIe links 360 for ports 310 and interface 370.

Central services unit 340 includes one or more functional units. For example, central services unit 340 may include one or more of: a bootstrap controller that is used at startup to set internal registers, repair internal memories and initialize switch 300; a clock generator that generates a core clock, generates derived clocks, distributes the clock signals to the appropriate units and, in some embodiments, generates clock enables to gate clocks when the corresponding units are not in operation; reset generator that provides the proper resets during initialization and soft resets; power manager that receives power management messages and facilitates entrance to and exit from the PCIe link; interrupt processor that generates the interrupts; error processor that detects errors and generates error messages; register access controller that responds to requests (e.g. from central management unit 350); and TLP generator that generates TLPs for performance analysis and debugging. In some embodiments, one or more functional units may be omitted and/or performed in another manner/by another component.

Central management unit 350 provides access via the corresponding interfaces 370. For example, central management unit 350 may be used to Flash memory (not shown) through one of the interfaces 370 shown during initialization. Central management unit 350 may also provide slave interface to access on-chip registers, provide communication to switch 300 during debugging and testing, and send/receive other signals via the interfaces 370.

Each port 310 performs some processing of packets in the embodiment shown. Thus, each port 310 includes a PCIe port logic (PPL) and packet processing unit (PPU). For other types of switches, other port logic may be used. PPLs 312-0, 312-1, 312-2, 312-3, 312-4, 312-5, 312-6, 312-7, 312-8, 312-9, 312-10, 312-11, 312-12, 312-13, 312-14, and 312-15 (collectively or generically PPLs 312) and PPUs 314-0, 314-1, 314-2, 314-3, 314-4, 314-5, 314-6, 314-7, 314-8, 314-9, 314-10, 314-11, 314-12, 314-13, 314-14, and 314-15 (collectively or generically PPUs 314) are shown. PPL 312 and PPU 314 perform various functions for port 310. Although described as separate functional units, in some embodiments, the functions of PPL 312 and/or PPU 314 may be performed in another manner and/or by another device.

PPL 312 interfaces with the devices coupled via links 360. Link 360 may be a PCIe×16 link. Thus, PPLs 312 may interface with GPUs, TPUs, FPGA Accelerators, and other CPUs through links 360. In some embodiments, the link speed can run up to 32 Gb/s Per lane, and the total aggregated bandwidth is 512 Gb/s Per Port. Thus, each port 310 has sixteen lanes in the embodiment shown. In some embodiments, another number of lanes and other speeds may be used. PPL 312 includes one or more SerDes/PCS (not shown) and PCIe media access control (MAC) Controller (not shown). In the ingress direction, the incoming packets pass through SerDes/PCS and MAC controller of PPL 312. The headers are decoded into individual fields and sent to the corresponding PPU 314. In the egress direction, PPL 312 receives packet headers and data information from PPU 314. PPL forms the packets (i.e. forms TLPs) and transmits them via the corresponding link 360 in a bit-stream format. PPU 314 parses the header information to determine the packet type and destination port (if the packet is to be forwarded to another port). For a packet ingressing via port 310, PPU sends the payload to memory 330 (in a manner as determined using scheduler 320) for temporary on-chip storage. In some embodiments, packet information (e.g. header information and the information regarding the location of the packet in memory 330) may be stored in port 310, for example in a virtual output queue (VOQ) described below.

Scheduler 320 allocates memory segments in banks of memory 330 and into which PPUs 314 to store packet segments. The specific scheduling processes (e.g. strict priority, weighted round robin) for packets that ingress switch 300 through a particular port 310 and egressing through various other ports 310 may also be selected by scheduler 320. As discussed with respect to method 200 and switch 100, scheduler 320 allocates memory such that a selected bank is identified to store the beginning packet segment, the beginning packet segment is stored in the selected bank, and subsequent packet segments are stored in the next adjacent banks. Scheduler 320 also controls retrieval of packet segments from memory 330 to be sent to an egress port 310.

Memory 330 has multiple banks configured such that packet segments from any of ports 310 may be stored in any bank. Thus, memory 330 may be coupled with ports 330 via a crossbar or analogous fabric of interconnections. Thus, memory 330 may be considered a multi-bank memory fabric. In some embodiments, memory 330 includes sixteen banks of memory. In other embodiments, another number of banks may be present. Each bank of memory 330 includes multiple memory segments. In some embodiments, each memory segment is a sixty-four byte segment. Other segment sizes, including variable memory segment sizes, may be used in some embodiments. In some embodiments, memory segments in a bank that store packet segments from the same packet need not be continuous. For example, if a bank stores two (or more) packet segments from the same packet in two memory segments, the two memory segments need not be contiguous. Thus, the two memory segments may be physically separated (i.e. not share a border) in the bank. In some embodiments, the two segments might share a border. In some embodiments, the packet segments are stored in a next available segment in a particular bank. Thus, the physical locations (e.g. addresses of memory segments) for two packet segments may or may not adjoin.

In operation, packets ingress switch 300 through ports 310. Packets are processed via PPLs 312 and PPUs 314. Scheduler 320 allocates memory 330 for packet segments to be stored in multiple banks of memory 330. PPUs 314 provide the packet segments to memory 330 for storage. Scheduler 320 determines a selected bank in which the beginning packet segment of a packet is stored. This beginning packet segment is stored in the selected bank. Scheduler 320 stores subsequent packet segments in order in the next adjacent bank. Thus, the second segment is stored in the bank next to the selected bank. The third packet segment is stored in the bank two banks away from the selected bank. This process continues until all packet segments have been stored. In some embodiments, scheduler 320 allocates memory in such a manner that memory allocation wraps around to the selected bank if there are more packet segments than memory banks.

Switch 300 shares the benefits of switch 100. Individual packets are stored across multiple banks of memory 330. As a result, memory utilization may be increased, transfer of packet across switch 300 may be improved and scheduler 320 may be more efficient. Consequently, switch 300 may be better able to serve systems requiring high data exchange rates, such as for ML and HPC applications.

Figure 4:
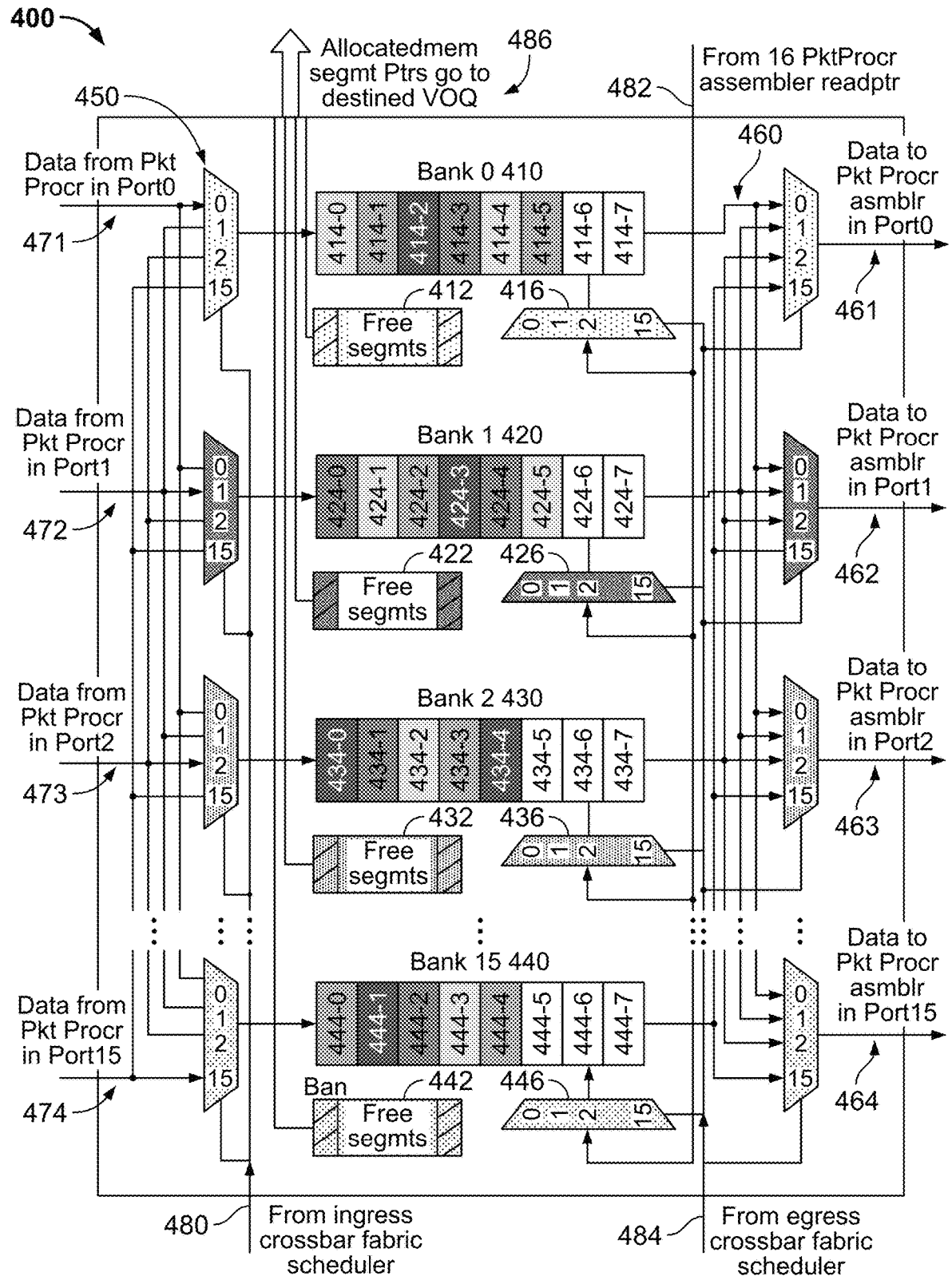
FIG. 4 depicts an embodiment of a multi-bank memory in a switch.

FIG. 4 depicts an embodiment of multibank memory 400 usable in a switch, such as switch(es) 100 and/or 300. For clarity, only some portions of memory 400 are shown. Memory 400 may be part of a PCIe switch and is described in the context of PCIe. However, in some embodiments, memory 400 may be used in another type of switch.

Memory 400 is analogous to memory 130 and/or 330. Thus, memory 400 has multiple banks. In the embodiment shown, memory 400 includes bank 0 410, bank 1 420, bank 2 430, through bank 15 440. Memory 400 thus has sixteen banks. In another embodiment, memory 400 may have another number of banks. Each bank 410 through 440 includes multiple memory segments. For simplicity, eight memory segments are shown in each bank. However, each bank 410, 420, 430 through 440 typically has a larger number of memory segments. Bank 0 410 includes memory segments 414-0, 414-1, 414-2, 414-3, 414-4, 414-5, 414-6, and 414-7 (collectively or generically memory segment(s) 414). Bank 1 420 includes memory segments 424-0, 424-1, 424-2, 424-3, 424-4, 424-5, 424-6, and 424-7 (collectively or generically memory segment(s) 424). Bank 2 430 includes memory segments 434-0, 434-1, 434-2, 434-3, 434-4, 434-434-6, and 434-7 (collectively or generically memory segment(s) 434). Bank 15 440 includes memory segments 444-0, 444-1, 444-2, 444-3, 444-4, 444-5, 444-6, and 444-7 (collectively or generically memory segment(s) 484). Different shadings for memory segments 414, 424, 434 and 444 in banks 410, 420, 430 and 440 indicate storage of different packets. For simplicity, bank 3 through bank 14 are not shown. Further, although memory segments 414, 424, 434 and 444 in each bank 410, 420, 430 and 440, respectively, are shown as adjoining (sharing borders), nothing prevents the segments 414, 424, 434 and 444 from being located in non-contiguous sections of banks 410, 420, 430 and/or 440, respectively.

Each bank 410, 420, 430, through 440 has a free segment indicator 412, 422, 432, through 442, respectively. Free segment indicators 412, 422, 432, through 442 include a list of memory segments within the corresponding bank 410, 420, 430, through 440, respectively, that are empty and available for storing packet segments. In some embodiments, free segment indicators 412, 422, 432, through 442 are linked lists. Each bank 410, 420, 430, through 440 also has a multiplexer 416, 426, 436, through 446, respectively. Also shown in FIG. 4 are switching fabric 450 and 460. In some embodiments, switching fabric 450 and 460 are considered part of memory 400. In some embodiments, switching fabric 450 and 460 may be considered separate from memory 400. Switching fabric 450 receives data from ports such as ports 110 and/or 310 via inputs 451, 472, 473, through 474. The identity of the bank of memory to receive packet segments for storage and the bank of memory to output packets for retrieval is indicated by scheduler via input 480. Switching fabric 460 receives packet segments that are retrieved from memory banks 410, 420, 430, through 440 and provides the packet segments to egress ports via outputs 461, 462, 463, through 464. The identity of the bank of memory to output packets from, as well as the egress port receiving such packets, may be provided by inputs 480, 482, and 484. Output 486 provides addressing information for memory segments 414, 424, 434, through 444 within a bank 410, 420, 430, through 440.

In operation, packet segments are received from inputs 471, 472, 473, through 474. The bank selected by the scheduler (not shown in FIG. 4), which is analogous to schedulers 120 and/or 320, is provided via input 480. In some embodiments, scheduler selects the bank for the beginning (first) segment in each packet. For the remaining packet segments in the packet, the bank may simply be incremented to store packet segments in the next adjacent bank. Using the information from the scheduler, switching fabric 450 (e.g. via a multiplexer shown), transfers the packet segments to the appropriate banks. Free segment indicators 412, 422, 432, through 442 identify the next segment that is free in each bank 410, 420, 430, through 440, respectively. The packet segment is stored in the next segment that is free in each bank 410, 420, 430, through 440. The identity of the memory segment in which the packet segments is stored (i.e. the next free segment) is output for storage via output 486. In some embodiments, the identity of the memory segment is stored in a linked list, for example as an address pointer to the address of the memory segment. In some embodiments, this information is stored in a VOQ as described with respect to FIG. 6. If the packet has additional segments, the bank in which a packet segment is to be stored is incremented. The process then repeats. For packets (or ports) in which there are no remaining packet segments for the packet, the next bank is free for storing segments of a new packet. When packets egress memory 400, the identities of the selected packets are provided via inputs 482 and 484 (from the scheduler). The packet segments are provided in order from the appropriate memory segments to switching fabric 460 and output to the appropriate egress port via outputs 461, 462, 463, through 464.

For example, the memory segments 414, 424, 434, through 444 in each bank 410, 420, 430, through 450 are shaded based upon the packet stored. Memory segments that are unshaded (white) are free. Thus, in bank 0 410, memory segments 414-6 and 414-7 are free. In bank 1 420, memory segments 424-6 and 424-7 are free. In bank 2 430, memory segments 434-5, 434-6 and 434-7 are free. In bank 15 440, memory segments 444-5, 444-6 and 444-7 are free. One packet has packet segments stored in memory segments 414-0 and 414-4 of bank 0 410, memory segments 424-1 and 424-5 of bank 1 420, 434-2 of bank 2 430, and memory segment 444-3 of bank 14 440. Another packet has packet segments stored in memory segments 414-1 and 414-5 of bank 0 410, memory segment 424-2 of bank 1 420, memory segment 434-3 of bank 2 430, and 444-4 of bank 15 440. A third packet has packet segments stored in memory segment 414-2 of bank 0 410, memory segment 424-3 of bank 1 420, memory segments 434-0 and 434-4 of bank 2 430, and memory segment 444-1 of bank 15 440. A fourth packet has packet segments stored in memory segment 414-3 of bank 0 410, memory segments 424-0 and 424-4 of bank 1 420, memory segment 434-1 of bank 2 430, and memory segment 444-2 of bank 15 440.

The packet segments stored in memory segments 414-0 and 414-4 of bank 0 410, memory segments 424-1 and 424-5 of bank 1 420, 434-2 of bank 2 430, and memory segment 444-3 of bank 14 440 may be stored as follows. Bank 0 410 is selected by the scheduler as the open bank used for the beginning segment of the packet. This beginning segment is stored in memory segment 414-0 of bank 0 410. The bank used for storage of the packet is incremented to bank 1 420 and the next packet segment stored in a free memory segment: memory segment 424-1. The bank used for storage of the packet is incremented to bank 2 430 and the next packet segment stored in memory segment 434-2. This continues until the bank used for storage is incremented to bank 15 440 and the next packet segments is stored in memory segment 434-4. Because the banks used for storage are incremented, incrementing the next bank used for storage wraps around to bank 0 410. The next packet segment is stored in memory segment 414-4. In the interim, packet segments for other packets were stored in memory segments 414-1, 414-2, and 414-3 of bank 0 410. The bank used for storage increments to bank 1 420 and the last packet segment is stored in memory segment 424-5. In the case shown, while the second packet segment of the packet is stored in memory segment 424-1 of bank 1 420, the packet segments of other packets are stored in bank 0 410 (memory segment 414-1), bank 2 430 (434-1) and bank 15 (444-1). Because the bank 410, 420, 430 or 440 is selected to store the beginning packet segment by the scheduler and because the next bank is determined by incrementing the selected bank, there are no collisions between banks 410, 420, 430, through 440. Packets may be selected for storage and output in an analogous manner when the packet is to egress to the destination port.

Memory 400 may be used in switch 100 and/or 300. Thus, a switch utilizing memory 400 shares the benefits of switch(es) 100 and/or 300. Individual packets are stored across multiple banks 410, 420, 430, through 440 of memory 400. As a result, memory utilization may be increased, transfer of packet across the switch may be improved, and the scheduler may be more efficient. Consequently, a switch using memory 400 with banks 410, 420, 430 through 440 allocated as described herein may be better able to serve systems requiring high data exchange rates, such as for ML and HPC applications.

Figure 5:
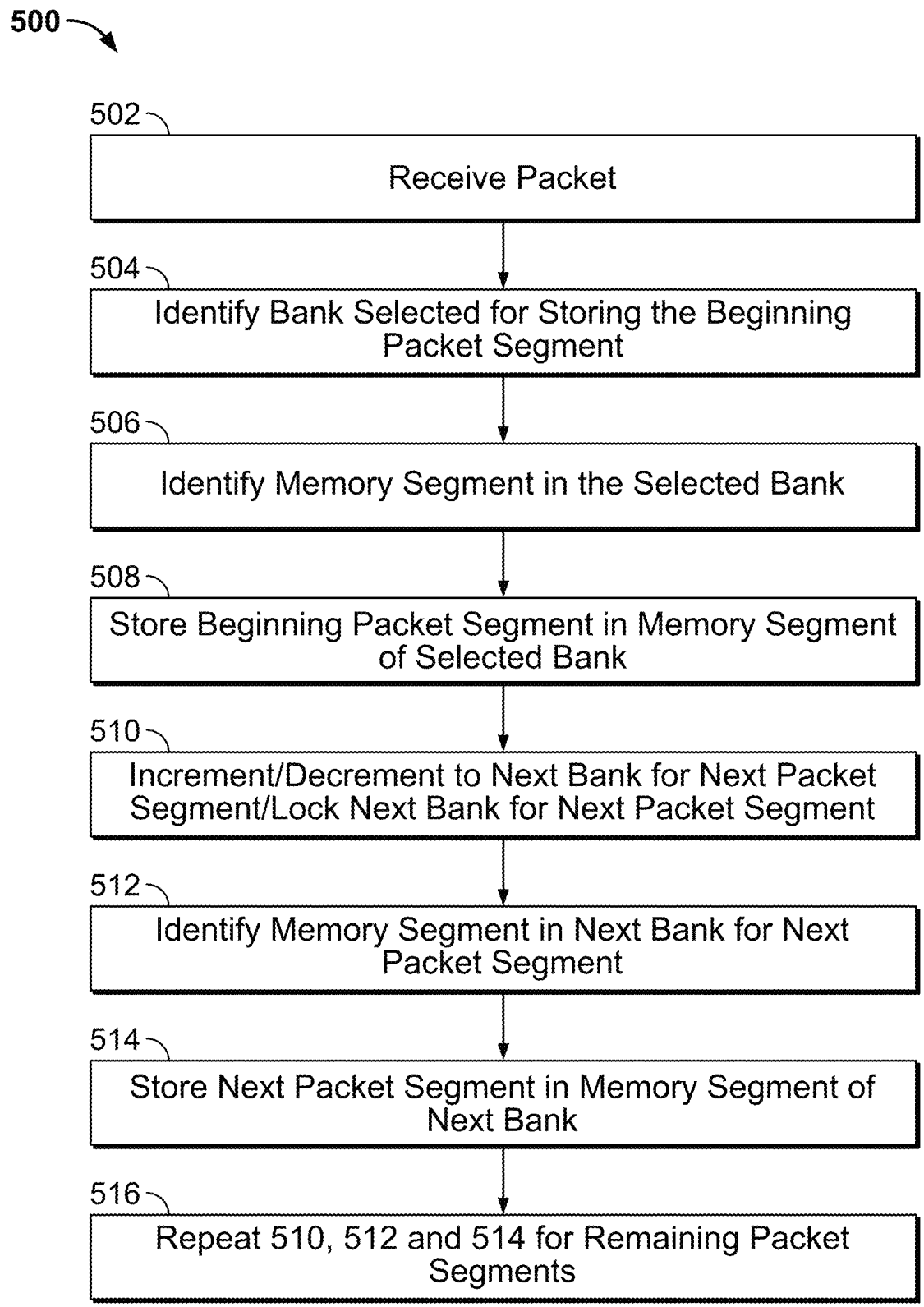
FIG. 5 is a flow-chart depicting an embodiment of a method for allocating memory for a multi-bank memory.

FIG. 5 is a flow-chart depicting an embodiment of method 500 for allocating memory in a switch including a multibank memory. Method 500 is described in the context of a single packet. However, portions method 500 may be performed in parallel for multiple packets entering the switch at multiple ports.

A packet is received in a port, at 502. In some embodiments, the packet may be a TLP including a header describing aspects of the packet such as length of the payload. The packet can be divided into packet segments, each of which has a length that is less than or equal to that of a memory segment. A bank in which the beginning packet segment is to be stored is selected, at 504. A free memory segment available for storing the beginning packet segment within the selected bank is also identified, at 506. The beginning packet segment is stored in the free memory segment of the selected bank, at 508. In addition, the identity of the beginning bank and the identity of the memory segment selected for the beginning segment are stored, for example as part of a linked list.

The remaining packet segments are stored at 510, 512, 514, and 516. To do so, the next adjacent bank is determined, at 510. This is accomplished by incrementing or decrementing the current bank selected for storing a packet segment. Also at 510 the next adjacent bank is locked. Consequently, the next adjacent bank will not be selected to store the beginning packet segment for a new packet. A free memory segment in the next adjacent bank is selected as the memory segment for storing the next packet segment (e.g. the second packet segment), at 512. The next (second) packet segment is stored in this memory segment at 514. The identity of the memory segment in which the second packet segment is also stored, for example as part of the linked list.

At 516, 510, 512 and 514 are repeated for the remaining packet segments. Thus, in the next iteration, the next adjacent bank is identified, for example by incrementing or decrementing the current bank at 510. This bank is also locked. A free memory segment for storing the third packet segment in this bank is identified at 512. The third packet segment is stored in this memory segment, at 514. The identity of the memory segment storing the third packet segment is stored (e.g. as part of the linked list). If there are additional packet segments, then 510, 512, and 514 are iterated through again at 516. Thus, the packet can be stored in multiple banks of a memory.

For example, a packet may be received at a port for memory 400, at 502. The header may be decoded by the port to determine the number of packet segments and thus the number of memory segments required. At 504, a beginning bank of memory 400 is selected for the packet and the beginning (i.e. first) packet segment stored in the beginning bank. Suppose that the bank that is available is bank 1 420. A free memory segment available for storing the beginning packet segment within the bank 1 420 is also identified, at 506. This may be segment 424-0. The beginning packet segment is stored in the free memory segment 424-0 of the selected bank 420, at 508. The identity of bank 1 420 and the identity of memory segment 424-0 selected for the beginning packet segment are stored.

The remaining packet segments are stored at 510, 512, 514, and 516. To do so, the next adjacent bank is determined, at 510. For memory 400, this is accomplished by incrementing the current bank (bank 1 420) to bank 2 430. Thus, the second packet segment will be stored in bank 2 430. Also at 510 the next adjacent bank (bank 2 430) is locked such that the beginning segment for a new packet will not be stored in this cycle at bank 2 430. A free memory segment in bank 2 430 is selected, at 512. Thus, memory segment 434-1 is selected at 512. The second packet segment is stored in memory segment 434-1, at 514. The identity memory segment 434-1 for the second packet segment is also stored.

At 516, 510, 512 and 514 are repeated for the remaining packet segments. Thus, in the next iteration, the next adjacent bank is identified by incrementing from bank 2 430. This continues through bank 15 440 at the fifteenth iteration of 510. Bank 15 440 is locked and memory segment 444-2 is identified as the free memory segment at 512. A packet segment is stored in memory segment 444-2, at 514. The identity memory segment 444-2 is stored. The bank is incremented again at 510. However, because bank 15 440 has the highest numerical designation, incrementing the bank wraps back to bank 0 410. Thus, bank 0 410 is identified and locked at 510. Memory segment 414-4 is identified as the free memory segment at 512 and the packet segment stored in memory segment 414-4 at 514. The identity of memory segment 514-2 is also stored. The bank is incremented again at 510 to bank 1 420. Memory segment 424-5 is identified as free at 512. The packet segment is stored in memory segment 424-5 at 514. Because this is the last packet segment, method 500 ends. Thus, the packet is stored in multiple banks 410, 420, 430, through 440 of memory 400.

Method 500 stores packet segments across multiple banks of memory 400 in a deterministic manner. Using method 500, utilization of memory 400 may be improved. Further, ports are less likely to be choked because a dedicated memory bank is full. Method 500 may also more efficiently schedule and perform storage of packets. As a result, the flow of data through a switch may be facilitated. Consequently, a switch using method 500 may be better able to serve systems requiring high data exchange rates, such as for ML and HPC applications.

Figure 6:
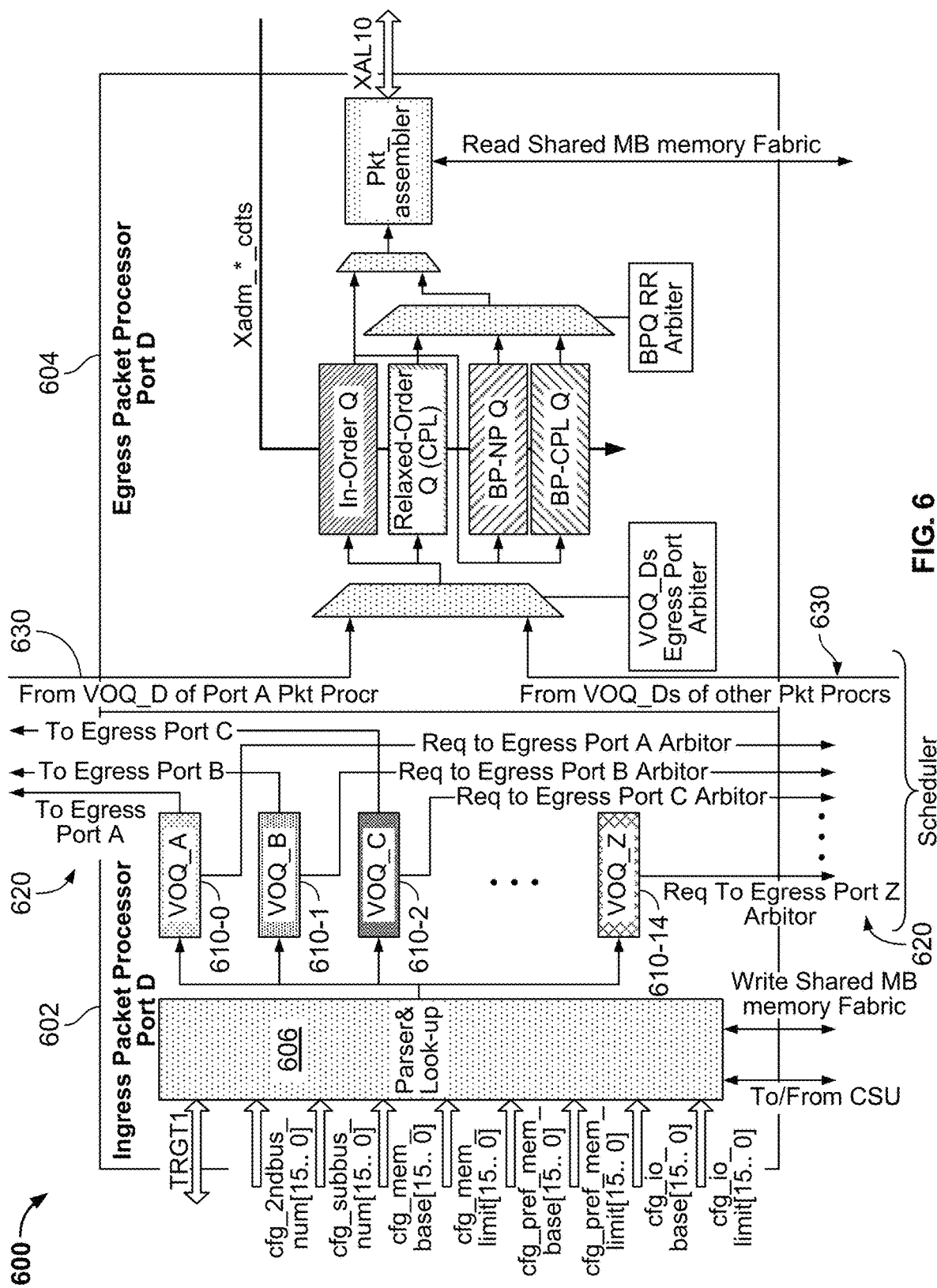
FIG. 6 depicts an embodiment of a processor for a port used in a switch having a multi-bank memory.

FIG. 6 depicts an embodiment of a portion of a PPU 600 for a port (port D) usable in a switch having a multi-bank memory. For example, port D may be used in switch(es) 100 and/or 300. Port D is analogous to port(s) 110 and/or 310. Port D may also be used in conjunction with memory 400. For clarity, only some portions of PPU 600 are shown. Port D may be part of a PCIe switch and is described in the context of PCIe. However, in some embodiments, port D and PPU 600 may be used in another type of switch.

PPU 600 includes ingress packet processor 602 and egress packet processor 604. Ingress packet processor includes a parser and lookup unit 606 as well as VOQs 610-0, 610-1, 610-2 through 610-14 (collectively or generically VOQs 610). VOQs 610 are for remaining ports in the switch. For example, if port D is one of sixteen ports for switch 300, then there are fifteen VOQs 610. VOQs 610 store packet information for packet segments that are egressing the port corresponding to the particular VOQ 610. Thus, VOQ 610-0 store packet information for packets egressing port A, VOQ 610-1 stores packet information for packets egressing via port B, VOQ 610-14 stores packet information for packets egressing via port Z. There is no VOQ for port D because VOQs 610 are in port D. VOQs 610 store information relating to where in memory the corresponding packets are stored. In some embodiments, VOQs 610 store the linked lists indicating the selected bank for the beginning packet segment and/the memory segments (e.g. address pointers) for each of the packet segment in each bank. VOQs 610 associated with a particular egress port are arbitrated for forwarding the packets to the egress port through corresponding scheduling algorithms (e.g. Strict Priority, Weight Round Robin) selected by the scheduler. Egress packet processor 604 receives data that is to egress via port D. Inputs 630 provide the packet information stored in the VOQs (not shown) for port D in the other ports. Using this information, the egress packet processor 604 reads the corresponding data from memory (not shown), reassembles the packet, and sends the packet out from port D.

In operation, a packet is received at port D and provided to PPU 600. In some embodiments, this occurs after a PPL such as PPL 312 performs its functions. In addition to determining the length of the packet (e.g. the number of packet segments), the destination port is also determined. Memory is allocated for the packet segments and the packet segments stored as described herein. Information relating to the packet is stored in the corresponding VOQ 610. For example, if the packet is to egress via port C, the packet information is stored in VOQ 610-2. When the packet is to egress from the port, packet information in the corresponding VOQ 610 is accessed. In the example above, when the packet is to egress port C, the packet information is obtained from VOQ 610-2. This packet information is provided to the appropriate port and the portions of the memory storing the packet accessed. Thus, the packet may be sent from the desired egress port. For packets egressing port D, the packet information is provided via inputs 630. The packet information is used to obtain the packet segments from memory, reassemble the packet and send the packet from port D.

Using PPU 600 and VOQs 610, head-of-line blocking issues may be addressed. In particular, each VOQ 610 stores information for the corresponding egress port. As a result, a delay or other issues introduced at a particular egress port should only affect the VOQ 610 for that egress port. The remaining egress ports and their VOQs 610 can still obtain the packet segments from memory and output the data. Consequently, head-of-line blocking may be reduced or eliminated. Moreover, PPU 600 may be used in a port for a switch allocating memory as described herein. Consequently, the benefits of switch(es) 100 and/or 300 and memory 400 may still be achieved. Thus, performance may be improved.

Figure 7:
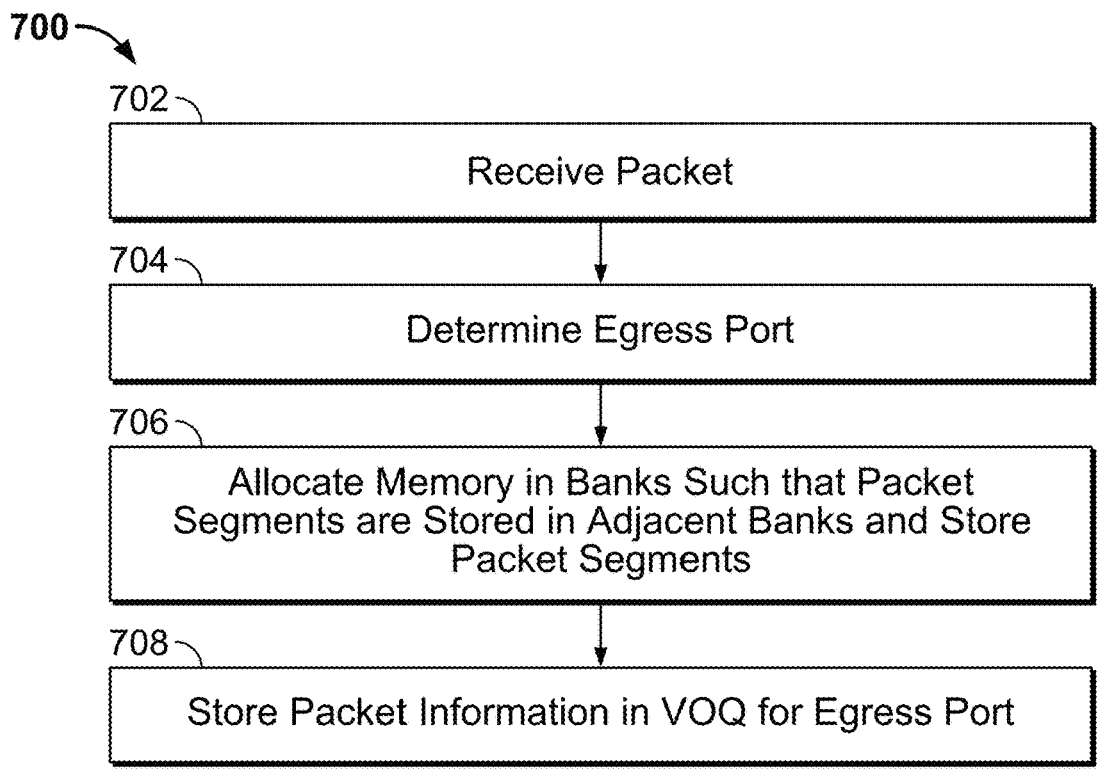
FIG. 7 is a flow-chart depicting an embodiment of a method for allocating memory for a multi-bank memory.

FIG. 7 is a flow-chart depicting an embodiment of method 700 for allocating memory in a switch including a multi-bank memory. Method 700 is described in the context of a single packet. However, portions method 700 may be performed in parallel for multiple packets entering the switch at multiple ports.

A packet is received in a port, at 702. Control information related to the packet is also determined, for example by decoding a header of the packet. Thus, the egress port for the packet may be identified, at 704. Packet length as well as other information may be determined.

Memory segments are allocated to the packet in a memory including multiple banks, at 706. Memory segments in the banks are allocated such that a beginning packet segment of the packet is stored in a selected bank and each subsequent packet segment in the packet is stored in order in a next adjacent bank. As a result, the packet is stored across multiple banks. In some embodiments, 706 may be performed as described in method 200 and/or method 500. In addition, packet information is stored in the VOQ for the egress port, at 708. For example, the location(s) in memory of the packet segments are stored in the VOQ.

For example, a packet ingressing a switch may be received at port D, at 702. The egress port for the packet is determined at 704. For example, port A may be determined to be the egress port at 704. Consequently, the corresponding VOQ 610-0 is also identified. Memory is allocated to the packet segments and the packet segments stored at 706. For example, the packet may be stored across banks 410, 420, 430, through 440 of memory 400. The packet information is stored in the egress port A's VOQ 610-0 in ingress port D. In some embodiments, the linked list indicating the selected bank for the beginning packet segment and the memory segment in each bank is stored in VOQ 610-0.

Using method 700, packet segments are stored across multiple banks of a memory in a deterministic manner. Utilization of the memory may be improved and ports, such as port D, may be less likely to be choked. Method 700 may also more efficiently schedule and perform storage of packets. As a result, the flow of data through a switch may be facilitated. In addition, packet information is stored in the VOQ 610 for the egress port. As a result, head-of-line blocking may be reduced or eliminated. Consequently, a switch using method 700 may be better able to serve systems requiring high data exchange rates, such as for ML and HPC applications.

Figure 8:
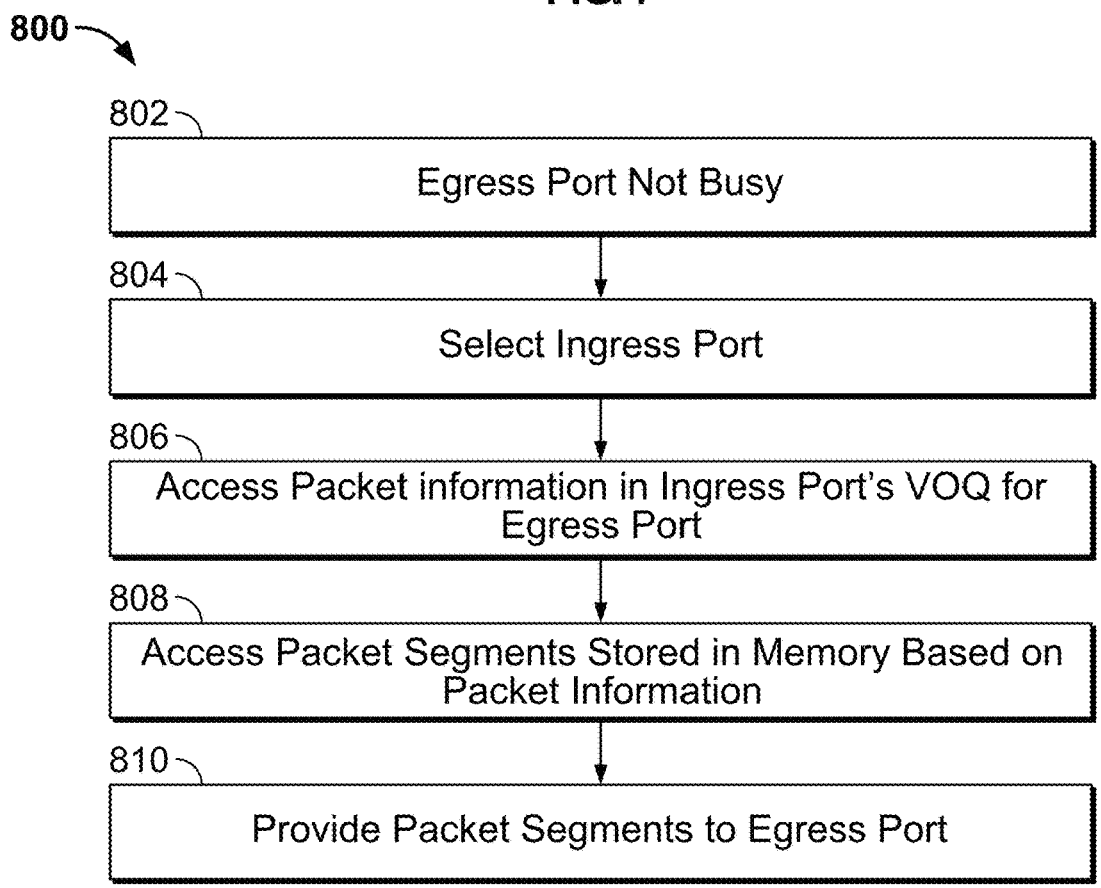
FIG. 8 is a flow-chart depicting an embodiment of a method for outputting packets from a switch using a multi-bank memory.

FIG. 8 is a flow-chart depicting an embodiment of method 800 for outputting packets in a switch including a multi-bank memory. Method 800 is described in the context of a single packet. However, portions method 800 may be performed in parallel for multiple packets entering the switch at multiple ports.

The desired egress port is determined to be capable of outputting a packet, at 802. The egress port for 802 may be identified by a scheduler using a desired arbitration mechanism. The corresponding ingress port, and thus the appropriate VOQ, is determined at 804. The packet information is accessed in the VOQ for the egress port at the ingress port, at 806. As a result, information indicating where in the memory the packet segments for the packet are stored can be obtained. The packet segments are obtained from memory based on this information, at 808. The packet segments are provided to the egress port, at 810. The packet segments may thus be assembled into a packet and output by the egress port.

For example, it may be determined that egress port A is not busy and that the packet ingressing at port D is to be output at port A. Thus, VOQ 610-0 is accessed at 806 to obtain packet information identifying where in memory 400 the packet is stored. The packet information may include the selected bank for the beginning (i.e. first) packet segment and the memory segment (e.g. address) in each bank that store the packet segments. Only the selected bank and memory segments are stored because it is known that the bank is incremented for each packet segment after the first packet segment. In some embodiments, the identity of another bank at which a packet segment is stored may be used. However, the first bank is generally convenient because subsequent banks may be identified by incrementing or decrementing from the first bank. Using the packet information, the appropriate memory segments 414, 424, 434 through 444 may be accessed to obtain the packet segments, at 808. The packet segments are provided to egress port A. Using an egress packet processor analogous to egress packet processor 604, the packet may be reassembled and output.

Using method 800, packet segments stored across multiple banks of a memory in a deterministic manner may be accessed, reassembled and output. Consequently, a switch such as switch(s) 100 and/or 300 may utilize PPU 600 and memory 400. Utilization of the memory may be improved, latency and efficiency improved, and data exchange facilitated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A switch, comprising:
 a plurality of ports through which packets ingress and egress the switch, each of the packets being divisible into a plurality of packet segments;
 a memory including a plurality of banks; and
 a scheduler coupled with the plurality of ports and the memory, the scheduler configured to allocate memory to store the plurality of packet segments in the plurality of banks such that a beginning packet segment of a packet is stored in a selected bank of the plurality of banks and each subsequent packet segment in the packet is stored in order in a next adjacent bank of the plurality of banks, wherein the allocating of the memory comprises to:
  store the beginning packet segment to the selected bank;
  lock the next adjacent bank for the next packet segment, wherein the locking of the next adjacent bank includes preventing a beginning segment for a new packet from being stored in the same cycle at the next adjacent bank; and
  store the next packet segment in the next adjacent bank.

2. The switch of claim 1, wherein each of the plurality of banks has a numerical designation and wherein the scheduler is configured to allocate the memory such that the order is an ascending numerical order.

3. The switch of claim 1, wherein each of the plurality of banks has a numerical designation and wherein the scheduler is configured to allocate the memory such that the order is a descending numerical order.

4. The switch of claim 1, wherein the scheduler is configured to allocate memory segments within each of the plurality of banks such that one packet segment of the plurality of packet segments is stored in a first memory segment in a bank, an other packet segment of the plurality of packet segments is stored in a next available memory segment of the bank.

5. The switch of claim 1, wherein the scheduler is configured to allocate memory segments within each of the plurality of banks such that one packet segment of the plurality of packet segments is stored in a first memory segment in a bank, an other packet segment of the plurality of packet segments is stored in a second memory segment of the bank, the second memory segment being noncontiguous to the first memory segment.

6. The switch of claim 1, wherein the scheduler is further configured to provide a linked list for the each of the packets, the linked list identifying the selected bank for the beginning packet segment and a memory segment within the next adjacent bank for each subsequent packet segment.

7. The switch of claim 1, wherein the switch is a Peripheral Component Interconnect Express (PCIe) switch.

8. The switch of claim 7, wherein the packet information includes a linked list for the packet, the linked list identifying the selected bank for the beginning packet segment of the packet, a beginning memory segment within the selected bank for the beginning packet segment, and a memory segment within the next adjacent bank for each subsequent packet segment.

9. The switch of claim 1, wherein a port of the plurality of ports further includes:
 a virtual output queue (VOQ) for each remaining port of the plurality of ports, the VOQ storing packet information for the packet ingressing through the port and egressing through each remaining port.

10. The switch of claim 1, wherein a number of the plurality of banks is more than two.

11. A Peripheral Component Interconnect Express (PCIe) switch, comprising:
 a plurality of ports through which packets ingress and egress the PCIe switch, each of the packets being divisible into a plurality of packet segments;
 a memory including a plurality of banks, each of the plurality of banks having a numerical designation; and
 a scheduler coupled with the plurality of ports and the memory, the scheduler configured to allocate memory to store the plurality of packet segments in the plurality of banks such that a beginning packet segment of a packet is stored in a selected bank of the plurality of banks and each subsequent packet segment in the packet is stored in ascending order of the numerical designation in a next adjacent bank of the plurality of banks, the next adjacent bank for a highest numerical designation bank being a lowest numerical designation bank, the scheduler further being configured to allocate memory segments within each of the plurality of banks such that one packet segment of the plurality of packet segments is stored in a first memory segment in a bank and for a subsequent packet segment of the plurality of packet segments stored in a second memory segment of the bank, the second memory segment can be noncontiguous to the first memory segment, wherein the allocating of the memory comprises to:

store the beginning packet segment to the selected bank;

lock the next adjacent bank for a next packet segment, wherein the locking of the next adjacent bank includes preventing a beginning segment for a new packet from being stored in the same cycle at the next adjacent bank; and store the next packet segment in the next adjacent bank.

12. A method, comprising:

receiving a packet in a port of a plurality of ports through which the packet ingresses and egresses a switch, the packet being divisible into a plurality of packet segments; and allocating memory segments in a memory including a plurality of banks such that a beginning packet segment of the packet is stored in a selected bank of the plurality of banks and each subsequent packet segment in the packet is stored in order in a next adjacent bank of the plurality of banks, wherein the allocating of the memory segments in the memory comprises:

storing the beginning packet segment to the selected bank;

locking the next adjacent bank for a next packet segment, wherein the locking of the next adjacent bank includes preventing a beginning segment for a new packet from being stored in the same cycle at the next adjacent bank; and storing the next packet segment in the next adjacent bank.

13. The method of claim 12, wherein the allocating further includes:

identifying a first memory segment in the selected bank for the beginning packet segment, the beginning packet segment being stored in the first memory segment;

identifying a next memory segment in the next adjacent bank for the next packet segment, the next packet segment being stored in the next memory segment; and wherein the repeating including repeating the identifying the next memory segment for remaining packet segments.

14. The method of claim 12, wherein each of the plurality of banks has a numerical designation and wherein the allocating memory further includes:

allocating the memory such that each subsequent packet segment in the packet is stored in the next adjacent bank in ascending numerical order, wherein the next adjacent bank for a highest numerical designation bank is a lowest numerical designation bank.

15. The method of claim 12, wherein each of the plurality of banks has a numerical designation and wherein the allocating memory further includes:

allocating the memory such that each subsequent packet segment in the packet is stored in the next adjacent bank in descending numerical order, the next adjacent bank for a lowest numerical designation bank being a highest numerical designation bank.

16. The method of claim 12, wherein the allocating further includes:

identifying memory segments within the plurality of banks such that multiple packet segments of the packet are stored in noncontiguous memory segments.

17. The method of claim 12, further comprising:

providing a linked list for the packet, the linked list identifying the selected bank for the beginning packet segment, a beginning memory segment within the selected bank for the beginning packet segment, and a memory segment within the next adjacent bank for each subsequent packet segment.

18. The method of claim 12, wherein the packet is configured to egress at a remaining port of the plurality of ports, the method further comprising:

storing packet information for the packet in a virtual output queue (VOQ) of the port, the VOQ corresponding to the remaining port.

19. The method of claim 18, wherein storing further the packet information further includes:

storing a linked list for the packet, the linked list identifying the selected bank for the beginning packet segment of the packet, a beginning memory segment within the selected bank for the beginning packet segment, and a memory segment within the next adjacent bank for each subsequent packet segment of the packet.

20. The method of claim 19, wherein the linked list includes addresses for the beginning packet segment and each subsequent packet segment.

* * * * *